US006875020B2

(12) United States Patent
Niddrie et al.

(10) Patent No.: US 6,875,020 B2
(45) Date of Patent: Apr. 5, 2005

(54) METHOD OF PROVIDING AN INDIVIDUALIZED ONLINE BEHAVIOR MODIFICATION PROGRAM USING MEDICAL AIDS

(75) Inventors: Donald G. Niddrie, Cold Spring Harbor, NY (US); Regina Warnock, Laurel Hollow, NY (US)

(73) Assignee: Rx Maxwell, Inc., Huntington, NY (US)

(*) Notice: Subject to any disclaimer, the term of this patent is extended or adjusted under 35 U.S.C. 154(b) by 56 days.

(21) Appl. No.: 10/264,428

(22) Filed: Oct. 4, 2002

(65) Prior Publication Data

US 2004/0067475 A1 Apr. 8, 2004

(51) Int. Cl.[7] .............................. G09B 11/00; A61B 5/00
(52) U.S. Cl. ...................... 434/236; 434/262; 600/300; 128/912
(58) Field of Search ................................. 434/236–238, 434/262, 307 R, 365, 322, 350; 128/912; 600/300; 705/2–4

(56) References Cited

U.S. PATENT DOCUMENTS

| | | | |
|---|---|---|---|
| 4,853,854 A | | 8/1989 | Behar et al. |
| 4,951,197 A | | 8/1990 | Mellinger |
| 5,016,917 A | | 5/1991 | Dubner et al. |
| 5,090,733 A | | 2/1992 | Bussiere |
| 5,207,580 A | | 5/1993 | Strecher |
| 5,596,994 A | * | 1/1997 | Bro ............................ 600/545 |
| 5,879,163 A | * | 3/1999 | Brown et al. ................ 434/236 |
| 5,908,383 A | * | 6/1999 | Brynjestad ................... 600/300 |
| 5,967,789 A | | 10/1999 | Segel et al. |
| 6,024,699 A | * | 2/2000 | Surwit et al. ................ 600/300 |
| 6,330,426 B2 | * | 12/2001 | Brown et al. ................ 434/362 |
| 6,381,577 B1 | * | 4/2002 | Brown ............................ 705/2 |
| 2002/0004725 A1 | * | 1/2002 | Martin et al. ................... 705/2 |
| 2002/0072933 A1 | * | 6/2002 | Vonk et al. ..................... 705/2 |
| 2002/0187463 A1 | * | 12/2002 | Aspe et al. ................... 434/362 |
| 2002/0194022 A1 | * | 12/2002 | Comite ........................... 705/2 |
| 2003/0003113 A1 | * | 1/2003 | Lewandowski ................ 705/3 |
| 2003/0186202 A1 | * | 10/2003 | Isenberg ..................... 434/236 |

FOREIGN PATENT DOCUMENTS

| | | | | |
|---|---|---|---|---|
| WO | WO 01/26027 A1 | * | 4/2001 | ........... G06F/19/00 |
| WO | WO 01/41037 A2 | * | 6/2001 | ........... G06F/19/00 |

OTHER PUBLICATIONS

Watt, Micheael; "Online guides ready to help you quit smoking"; Apr. 26, 2002; Long Island Bussiness News, 49, 18 20A(1) iwillstop.com, Jun. 2002; 4 sheets.*

* cited by examiner

Primary Examiner—Xuan M. Thai
Assistant Examiner—Kathleen M. Christman
(74) Attorney, Agent, or Firm—Dilworth & Barrese, LLP

(57) ABSTRACT

A method of providing an individualized online behavior modification program using medical aids. The method comprises the steps of: registering an individual that desires to modify a specific behavior; consulting with the individual; providing a suggested treatment plan including recommended medical aids based on information about the individual obtained during the registering step and consulting step; delivering the suggested treatment plan including the medical aids to a health care provider selected by the individual; providing a finalized treatment plan by incorporating the suggested treatment plan and suggestions from the health care provider; monitoring the individual's treatment; modifying the finalized treatment plan by adjusting accordingly the final treatment plan based on information received during the monitoring of the individual's treatment; and providing a final assessment.

19 Claims, 2 Drawing Sheets iwillstop.com

Suggested Treatment Plan*

Client Name: Fred Quigley                                           Date:    2/9/02

Quit Date:

Initial Nicotine Consumption:    35 mg/day

Stabilization Medication:

| | | | |
|---|---|---|---|
| Wellbutrin SR. | 150 mg. | q d AM | 90 tablets |

Nicotine Replacement Therapy (NRT):

| | | |
|---|---|---|
| Passive Nicotine. | Patch | 21 mg on 24h/day |
| Active Nicotine. (ad lib) | Inhaler | 3 to 4 cartridges/day |
| | Gum | None |
| | Nasal Spray | None |

Exercise Regimen:

The following minimum exercise regimen is recommended: walking for 15 to 30 minutes a day at least three times a week. Consult your physician before beginning or altering any exercise regimen

Deliver this Plan of Treatment to your personal physician for approval and written prescription.

\* The Stabilization Medication and NRT Plan of Treatment outlined above are the iwillstop.com Medical Team recommendations and are based upon the Clinical Practice Guideline, "Treating Tobacco Use and Dependence" published by the US Public Health Service, June 2000.

Note to MD: This is the recommended Plan of Treatment for your patient named above on this date. The plan is based upon an individual assessment of your patient's smoking history and daily nicotine consumption. The treatment will be tapered over the next 3-6 months, and the complete program is for one year. We will provide you with progress reporting during the medication tapering process. See the accompanying Physician Transmittal Letter which may contain important information regarding the appropriateness of the iwillstop.com Smoking Cessation Program for your patient.

Fig. 2

METHOD OF PROVIDING AN INDIVIDUALIZED ONLINE BEHAVIOR MODIFICATION PROGRAM USING MEDICAL AIDS

BACKGROUND

1. Technical Field

The present invention relates generally to an online behavior modification method, and more particularly to a method of providing an individualized online behavior modification program using medical aids.

2. Description of the Related Art

Various methods and systems are publicly available to assist people in changing unhealthy or otherwise undesirable habitual health-related behavior, such as smoking, over eating, and drug and alcohol abuse. Assisting people to cease smoking is one of the more common applications. For example, National Health Promotions, Inc., under the Service Mark SMOKE STOPPERS®, provides an approach that makes use of a bound, multi-page workbook entitled "Quitter's Countdown: Preparing to Stop," Copyright 1991, by the National Center for Health Promotion. The workbook includes a multi-page questionnaire to be filled out by an individual desiring to quit smoking. Following the questionnaire portion in the workbook is a sequence of pages establishing the regimen of the non-smoking plan to be followed by the individual. In particular, these successive pages of the workbook include instructions for each successive day of the plan, e.g., instructions for "Day One," "Day Two," etc. These daily instructions are spread out over a number of pages in the workbook and included text, charts, diagrams, etc.

While the workbook or calendar approach for providing daily instructions to achieve health-related behavior modification has considerable merit, it suffers from several drawbacks. One of the most significant drawbacks is that the multi-page format of the materials for each day of the plan tends to overwhelm the individual with excessive information. Moreover, the fact that the workbook is bound and includes all of the materials provided at one time, enables the individual to prematurely view latter stage instructions, which could tend to distract the individual. Further still, if the daily pages include the calendar date, so that the plan is tied to any particular date (e.g., the first day of the plan is June 6th), it is susceptible to deviation by the individual as will be discussed later.

U.S. Pat. No. 5,207,580 (Strecher) discloses a health-related behavior change and adherence aid system, which overcomes some of the disadvantages of the prior art. The disclosed embodiments of that system are particularly directed to helping a person stop smoking permanently and utilizes the technique of "computer tailoring" to derive a particular regimen to be followed by the individual wishing to stop smoking. To that end, health risk and psychological information is gathered from the individual. That information comprises demographic information relevant to the health risk, history and patterns of the existing health-related behavior, motives to change that behavior, a specific behavior change goal, specific dates for beginning phases of the health-related behavior change process, and barriers to changing the health-related behavior. This data is provided into a computer system for processing to develop a specific or "tailored" plan best suited to that individual to maximize his/her chance of success. Thus, the computer makes use of an algorithm to process the data to produce a customized plan or regimen to be followed. To facilitate the plan the person is provided with a calendar defining the plan and instructions and recommendations for the individual to follow. The calendar is provided to the individual either in the form of a single monthly calendar sheet, i.e., a sheet with spaces for each day of the month, or series of date book pages. In either case the calendar includes spaces containing specific instructions and advice for the individual to follow. Moreover, and quite significantly, each of the days of the calendar is "dated." That is, they bear indicia with the specific calendar date of that day.

While the system and method of the Strecher patent are generally suitable for their intended purposes, they still leave something to be desired from the standpoint of efficiency and efficacy. In particular, by relying on "dated pages," wherein the particular instructions of the regimen are tied to a specific calendar date (e.g., a quit date of June $9^{th}$), should the individual using the method miss that date or any other date and thus get out of synchronism with the plan, the individual may wind up skipping another day or multiple days to get back in synchronism with the regimen. This deviation from the plan may result in its failure. Moreover, by presenting the information in the form of a monthly calendar with all the information for each day of the month being perceptible at one time, the individual may be overwhelmed by the information and may become distracted by prematurely reading latter day instructions. Thus, the system of the Strecher patent provides too much information on the one hand, while also providing too little information on the other. With regard to the latter, the amount of information provided for a specific day is rather limited by the inherent size of the monthly calendar sheet and the particular daily spaces for the daily instructions.

Other prior art methods or systems that exist for providing information to individuals wishing to modify a habit or some undesirable health-related behavior are found in the following U.S. Pat. No. 4,951,197 (Mellinger); U.S. Pat. No. 4,853,854 (Behar et al.). Regimen calendars have also been proposed in the patent literature, e.g., U.S. Pat. No. 5,016,917 (Dubner) and U.S. Pat. No. 5,090,733 (Busiere).

In more recent art, U.S. Pat. No. 5,967,789 (Segel et al.), disclosed is a system and method for stopping or modifying undesirable heath related habits. In Segel, a computerized method is disclosed in which the inflexibility (i.e., the rigidity of the schedule) of the above-mentioned patents is overcome by receiving personal information from an individual using the method while an initial plan is in use, thereby allowing the initial plan to be modified accordingly, based on the received personal information.

In the realm of behavior modification methods, especially those dealing with chemical dependency or over use, a large number of medical aids, both prescription and non-prescription, are constantly being developed. The medical aids, when used properly, can greatly assist an individual in changing their behavior or overcoming a chemical dependency. Notwithstanding the foregoing prior art, a need exists for an effective method of providing an individualized online behavior modification program including an individualized treatment plan utilizing these medical aids. A behavior modification program such as this, will enable a user to create, monitor, and modify an individualized treatment program with greater ease as the entire process can be performed online conforming to the user's busy schedule.

SUMMARY

It is, therefore, an object of the present invention to provide a method of providing an individualized online behavior modification program using medical aids, which enables a user to register himself/herself online (via the internet), set up a personalized treatment program online, monitor the user's progress online, and modify the user's treatment program online (if necessary) until completion.

It is another object of the present invention to provide a method of providing an individualized online behavior modification program using medical aids that is adaptable to an individual's progress.

It is yet another object of the present invention to provide a method of providing an individualized online nicotine cessation program.

To achieve the above and other objects, the present invention provides a method of providing an individualized online behavior modification program using medical aids, comprising the steps of: registering an individual that desires to modify a specific behavior; consulting with the individual; providing a suggested treatment plan including recommended medical aids based on information about the individual obtained during the registering step and consulting step; delivering the suggested treatment plan including the medical aids to a health care provider selected by the individual; providing a finalized treatment plan by incorporating the suggested treatment plan and suggestions from the health care provider; monitoring the individual's treatment; modifying the finalized treatment plan by adjusting accordingly the final treatment plan based on information received during the monitoring of the individual's treatment; and providing a final assessment.

BRIEF DESCRIPTION OF THE DRAWINGS

The above and other objects, features, and advantages of the present invention will become more apparent from the following detailed description when taken in conjunction with the accompanying drawings in which:

FIG. 2 is a sample view of a suggested treatment plan to be presented to a health care provider.

DETAILED DESCRIPTION OF THE PREFERRED EMBODIMENTS

Figure 1:
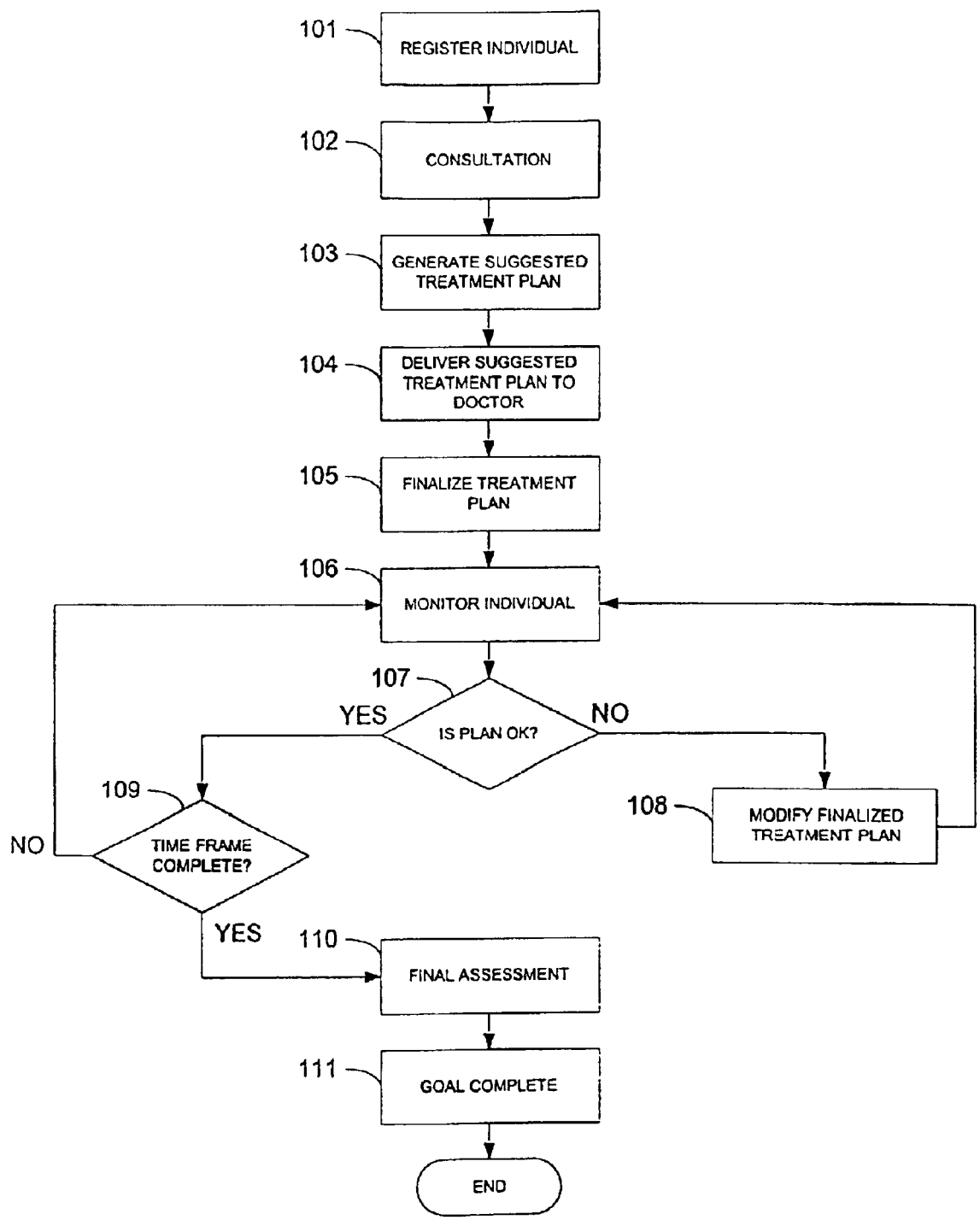
FIG. 1 is flow chart illustrating a preferred method of assisting an individual in stopping smoking according to the present invention.

A preferred embodiment of the present invention will be described herein below with reference to the accompanying drawings. In the following description, well-known functions or constructions are not described in detail since they would obscure the invention in unnecessary detail.

It should be pointed out that although the present invention will be described below with reference to a method for stopping smoking, the present invention can be used to assist an individual in ending any other undesirable behavioral habit or chemical dependency, misuse, or over use, based on information provided by the individual, using various medical aids, both prescription and non-prescription. In short, the method for stopping smoking (e.g. ending nicotine use) described below is merely exemplary and other cessation/ prevention methods can be constructed in accordance with this invention.

FIG. 1 is flow chart illustrating a preferred method of assisting an individual in stopping smoking according to the present invention. In accordance with a preferred method of this invention, a preparatory phase is conducted in which an individual wishing to enter an online smoking cessation program is registered (step 101). The registration phase, though extremely flexible in operation, basically consists of collecting the individual's personal information. In this phase, questions are communicated to the individual to gather personal information from him/her to customize or tailor the plan so that it has its greatest chance of success. The questions for the individual include, among other things, name, age, daily consumption, years of smoking, number of attempts at quitting, or any other questions deemed suitable. These questions are preferably communicated to the individual in a questionnaire form on a web page accessed by the individual by any suitable means of Internet access, such as a personal computer, a mobile telephone with web browsing capabilities, or a personal digital assistant (PDA) with Internet capabilities. Alternatively, if the individual has his/her own personal computer system, the questionnaire may be provided via e-mail or a personal computer program disk or CD-ROM to run on his/her computer to provide the questions. If using this alternate method, the answers to the questions are then e-mailed back to the provider of the service, or printed and then mailed back.

Another part of the registration process is providing the individual with introductory information, which is specific to the particular behavior modification program to be followed. For example, in this case where the behavior is smoking, the individual is provided with specific introductory information relating to smoking. Preferably, that information is differentiated to the individual's particular situation, e.g., teen smokers, pregnant smokers, heavy smokers, etc. Preferably, this preparatory information is provided to the individual on a web page by any suitable means of Internet access. However, as with the questionnaire described above, the information could also be e-mailed to the individual or included on a CD-ROM.

In accordance with the preferred method of this invention, in step 102, a consultation is performed with the individual and the service provider. This consultation step 102 can be conducted in person (e.g. a face-to-face interview), over the phone, or online in a private chat room format. In the consultation 102, more information about the individual is gathered. This information includes the individual's likes and dislikes as to methods of quitting smoking (e.g., a nicotine patch, inhalers, gum, etc.), medical history, daily routines, and other information that will assist the service provider to generate a suggested treatment plan.

At the end of the consultation 102, a suggested treatment plan (step 103) is generated and provided to the individual, including a list of any suggested medical aids, both prescription and non-prescription, and a quitting schedule including a daily schedule, based on the individual's information gathered during the registration 101 and the consultation 102. FIG. 2 is a sample view of a suggested treatment plan to be presented to a health care provider. As is illustrated in FIG. 2, the medical aids included in the suggested treatment plan in the preferred embodiment include Stabilization Medication (i.e., prescription medication) and Behavior Alternatives, such as NRT (Nicotine Replacement Therapy) which includes various types of nicotine replacement products such as inhalers, gum, patch, nasal spray, etc. The types of Stabilization Medication and Behavior Alternatives (in this case, Nicotine Replacement Therapy), of course, will vary depending on the type of behavior the treatment plan is attempting to modify.

The suggested treatment plan is then provided, preferably via a secure Internet service, to the individual's health care provider for review in step 104. The health care provider reviews the individual's suggested treatment plan, making changes where appropriate based on the individual's medical history and the health care provider's medical experience, and writes a prescription for any prescription medical aids that are necessary.

After the health care provider reviews the suggested treatment plan and prescribes any necessary prescription medical aids in step 104, the health care provider's changes and/or approval are sent back to the service provider and a finalized treatment plan is formulated in step 105 based on all the information acquired in steps 101–104.

As mentioned above, the finalized treatment plan varies on a case-by-case basis depending on the individual's information, established by the individual's answers to the questionnaire and information gathered during the consultation in step 102 and from the health care provider in step 104, and serves as an individualized plan produced for that individual. In the preferred method, it is desirable to enable the individual to provide the service provider with updated personal information so that individual's finalized treatment plan may be modified or adjusted during the days making up the plan in order to more closely tailor the plan to the individual. Therefore, in step 106 each individual makes entries over the Internet in a personal account set up at the web page of the service provider. In step 106, each day (or interval) as indicated in the finalized treatment plan, in order for the user to log onto the Internet and a web page of the service provider, the individual is given a personal identification number (PIN) to gain access to that web-site, to enable the individual to provide updated personal information and comments as to their progress, either by answering questions presented on the web page or creating a daily journal type entry. The service provider reviews the individual's updated information either personally or through the service provider's computer system in conjunction with expert system software, and then determines whether the individual's treatment plan should be modified based on the individual's updated information in step 107. This is extremely important because the more involved the user is, the better the chance of success is for the treatment plan. If the plan requires modification, the service provider will then contact the individual with an updated finalized treatment plan or necessary information (i.e., an answer to a question that the individual presented to the service provider) in step 108. The updated finalized treatment plan and information are preferably provided back to the person immediately, e.g., while the person is still at the web site. Alternatively, the updated finalized treatment plan or information may be delivered in any other suitable manner or at any suitable time by any means. After the treatment plan is modified in step 108, the process returns to step 107.

If the plan is determined not to require modification, in step 109 the time frame set in the treatment plan is checked to see if it is complete, and if so, a final assessment is performed for the individual, based on all the information obtained throughout the entire process in step 110. The final assessment includes a final determination by the service provider as to the individual's progress and the effectiveness of the program, and a recommended maintenance program (e.g., a long term self maintenance program), or recommended continuation of the program. The final assessment may also include a personal final assessment from the individual, as well as from the individual's health care provider.

It must be reiterated at this juncture that the method of the present invention has wide applicability, and thus is not limited to smoking cessation plans. Thus, it can be used to modify any undesirable behavior. Moreover, it can be used to establish a plan for maintaining a desired behavior, e.g., it can be used to help a person who has already quit smoking to maintain that behavior, to aid a person who has lost weight to keep the weight off, etc. In fact, the subject system and method can be used in any application calling for habitual behavior modification and/or maintenance, whether or not health related.

As described above, the present invention provides an individualized online behavior modification program using medical aids, which enables a user to conveniently and effectively set up a personalized treatment plan, adhere to the treatment plan, modify the treatment plan if necessary, and reach their desired goal, all via the Internet, thereby allowing the program to fit into their daily schedules.

While the invention has been shown and described with reference to a certain preferred embodiment thereof, it will be understood by those skilled in the art that various changes in form and detail may be made therein without departing from the spirit and scope of the invention as defined by the appended claims.

What is claimed is:

1. A method of providing an individualized online behavior modification program using medical aids, comprising the steps of:

registering an individual that desires to modify a specific behavior;

providing the individual with a personal online account, enabling the individual to access the online program;

consulting with the individual;

providing a suggested treatment plan including recommended medical aids based on information about the individual obtained during the registering step and consulting step;

delivering the suggested treatment plan to a health care provider, to prescribe or recommend the medical aids to be used by the individual based on the recommended medical aids included in the suggested treatment plan;

providing a finalized treatment plan by incorporating suggestions received from the health care provider into the suggested treatment plan to form the finalized treatment plan;

monitoring the individual's treatment; and providing a final assessment by receiving a personal final assessment from the individual including an effectiveness determination, and receiving a final assessment from the health care provider of the individual.

2. The method as described in claim 1 wherein the medical aids include stabilization medication and behavior alternatives.

3. The method as described in claim 1 wherein the step of registering the individual comprises acquiring personal information from the individual.

4. The method as described in claim 1 wherein the step of consulting with the individual comprises acquiring from the individual habit information and personal preferences as to various options for modifying the specific behavior.

5. The method as described in claim 1 wherein the suggested treatment plan comprises:

a suggested time frame for completion of the behavior modification program including a suggested daily schedule;

wherein the suggested daily schedule provides a suggested schedule for the behavior modification and a schedule for use of the medical aids.

6. The method as described in claim 1 wherein the step of monitoring treatment comprises:

receiving daily updates from the individual via the individual's personal online account;

analyzing the daily updates from the individual; and providing the individual with feedback based on the analysis of the individual's daily updates.

7. The method as described in claim 1, further comprising:

analyzing daily updates received from the individual, the personal final assessment from the individual, and the final assessment from the health care provider; and providing the individual with an effectiveness assessment and a long term self maintenance procedure.

8. The method as described in claim 1 further comprising modifying the finalized treatment plan by adjusting accordingly the final treatment plan based on information received during the monitoring of the individual's treatment.

9. The method as described in claim 8 wherein the step of adjusting the finalized treatment plan comprises:

modifying a suggested use of the medical aids, based on feedback received from the individual; and modifying a suggested time frame for completion of the behavior modification program provided in the finalized treatment plan, based on progress of the individual.

10. The method as described in claim 1 wherein the specific behavior is one of smoking, excess alcohol consumption, overeating, and drug addiction.

11. A method of providing an individualized online behavior modification program using medical aids, comprising the steps of:

registering an individual that desires to modify a specific behavior via a web page;

providing the individual with a personal online account, enabling the individual to access the online program;

consulting with the individual;

providing a suggested treatment plan including recommended medical aids based on information about the individual obtained during the registering step and consulting step;

delivering the suggested treatment plan including the medical aids to a health care provider;

providing a finalized treatment plan by incorporating the suggested treatment plan and suggestions from the health care provider;

monitoring the individual's treatment;

modifying the finalized treatment plan by adjusting accordingly the final treatment plan based on information received during the monitoring of the individual's treatment; and providing a final assessment by receiving a personal final assessment from the individual including an effectiveness determination, and receiving a final assessment from the health care provider of the individual.

12. The method as described in claim 11 wherein the medical aids include stabilization medication and behavior alternatives.

13. The method as described in claim 11 wherein the step of registering the individual comprises acquiring personal information from the individual.

14. The method as described in claim 11 wherein the step of consulting with the individual comprises acquiring from the individual habit information and personal preferences as to various options for modifying the specific behavior.

15. The method as described in claim 11 wherein the suggested treatment plan comprises:

a suggested time frame for completion of the behavior modification program including a suggested daily schedule;

wherein the suggested daily schedule provides a suggested schedule for behavior modification and a schedule for using the medical aids.

16. The method as described in claim 11 wherein the step of monitoring treatment comprises:

receiving daily updates from the individual via the individual's personal online account;

monitoring the daily updates from the individual;

analyzing the daily updates from the individual; and providing the individual with feedback based on the analysis of the individual's daily updates.

17. The method as described in claim 11 wherein the step of providing the final assessment comprises:

analyzing daily updates received from the individual, the personal final assessment from the individual, and the final assessment from the health care provider; and providing the individual with an effectiveness assessment and a long term self maintenance procedure.

18. The method as described in claim 11 wherein the step of modifying the finalized treatment plan comprises:

modifying a suggested use of the medical aids, based on feedback received from the individual; and modifying a suggested time frame for completion of the behavior modification program provided in the finalized treatment plan, based on progress of the individual.

19. A method of providing an individualized online nicotine cessation program, comprising the steps of:

registering an individual that desires to cease using products containing nicotine, by acquiring information about the individual;

providing the individual with a personal online account, enabling the individual to access the online program;

consulting with the individual to determine preferred treatment options;

providing a suggested treatment plan including recommended medical aids, based on information about the individual obtained during the registering step and consulting step;

delivering the suggested treatment plan including the recommended prescription plan and the recommended non-prescription plan to a health care provider selected by the individual;

providing a finalized treatment plan based on the suggested treatment plan and suggestions from the health care provider;

monitoring the individual's treatment via the individual's personal online account;

modifying the finalized treatment plan by adjusting accordingly the finalized treatment plan based on information received during the monitoring of the individual's treatment; and providing to the individual a final assessment including an effectiveness assessment and a long term self maintenance procedure by receiving a personal final assessment from the individual including an effectiveness determination, and receiving a final assessment from the health care provider of the individual;

wherein the medical aids include stabilization medication and nicotine replacement therapy.

* * * * *